US006686559B1

(12) United States Patent
Walters

(10) Patent No.: US 6,686,559 B1
(45) Date of Patent: Feb. 3, 2004

(54) ELECTRODE FOR PLASMA ARC TORCH AND METHOD OF MAKING THE SAME

(75) Inventor: Jeffrey K. Walters, Bradenton, FL (US)

(73) Assignee: The American Torch Tip Company, Bradenton, FL (US)

( * ) Notice: Subject to any disclaimer, the term of this patent is extended or adjusted under 35 U.S.C. 154(b) by 33 days.

(21) Appl. No.: 10/112,705

(22) Filed: Apr. 2, 2002

(51) Int. Cl.[7] .................................... B23K 10/00

(52) U.S. Cl. .................... 219/121.52; 219/119; 219/75; 219/121.48; 219/121.59

(58) Field of Search ....................... 219/121.52, 121.48, 219/121.46, 121.39, 74, 75, 119, 121.36; 313/231.31; 315/111.21

(56) References Cited

U.S. PATENT DOCUMENTS

| | | | | |
|---|---|---|---|---|
| 3,930,139 A | | 12/1975 | Bykhovsky et al. | |
| 5,023,425 A | | 6/1991 | Severance, Jr. | |
| 5,676,864 A | * | 10/1997 | Walters | 219/121.52 |
| 5,767,478 A | | 6/1998 | Walters | |
| 6,452,130 B1 | * | 9/2002 | Qian et al. | 219/121.52 |
| 6,483,070 B1 | * | 11/2002 | Diehl et al. | 219/121.52 |
| 6,563,075 B1 | * | 5/2003 | Severance, Jr. et al. | 219/121.46 |

* cited by examiner

*Primary Examiner*—Mark Paschall
(74) *Attorney, Agent, or Firm*—Sughrue Mion, PLLC

(57) ABSTRACT

An electrode for supporting an arc in a plasma arc torch. The electrode includes a metallic holder having a front end and a rear end. An emissive insert cavity is formed in the front end. An emissive insert is mounted in the cavity and is a metallic material having a relatively low work function. The front end is a casting made of a metal which is selected from silver, gold, platinum, rhodium, indium, palladium, nickel and alloys thereof. The rear end is a metal selected from copper and copper alloys. A cylindrical post extends inwardly from the front end of the metallic holder. The cylindrical post has an inner-rear tip portion which is a metal selected from copper and copper alloys.

10 Claims, 3 Drawing Sheets

Step S3

Step S1

Step S2

Step S3

Step S4

ELECTRODE FOR PLASMA ARC TORCH AND METHOD OF MAKING THE SAME

BACKGROUND OF THE INVENTION

Apparatus and methods consistent with the present invention relate to a plasma arc torch and, more particularly, to a novel electrode for use in a plasma arc torch having an improved service life and a method of making the same.

Commonly used for working of metals, plasma arc torches are used for cutting, welding, surface treatment, melting and annealing. These torches include an electrode that supports an arc that extends from the electrode to the workpiece in the transferred arc mode of operation. It is also conventional to surround the arc with a swirling vortex of gas, and in some torch designs, it is conventional to envelope the gas and arc with a swirling jet of water.

The electrode used in a conventional torch of the type described typically comprises an elongate tubular member having a material of high thermal conductivity, such as copper or copper alloy. The forward or discharge end of the tubular electrode includes a bottom end wall having an emissive insert embedded therein, which supports the arc. The insert includes a material which has a relatively low work function, which is defined in the art as the potential step, measured in electron volts, which permits thermionic emission from the surface of a metal at a given temperature. In view of its low work function, the insert is thus capable of readily emitting electrons when an electrical potential is applied thereto, and commonly used insert materials include hafnium, zirconium, and tungsten.

One of the major problems connected with the torches referred to above is the shortness of service life of their electrodes, especially when the torches are used with an oxidizing arc gas, such as oxygen or air. In those torches, the gas appears to rapidly oxidize the copper, and as the copper oxidizes, its work function fails. As a result, the oxidized copper that surrounds the insert begins to support the arc in preference to the insert. After this occurs, the copper melts, thereby causing early destruction and/or failure of the electrode.

U.S. Pat. No. 5,023,425 (Severance, Jr.) which issued on Jun. 11, 1991, and which is incorporated herein by reference, discloses an electrode for a plasma arc torch wherein the electrode includes a copper holder having a lower end which mounts an emissive insert that acts as the cathode terminal for the arc during operation. A sleeve of silver is positioned in a cavity to surround the insert and forms an annular ring on the lower end surface of the holder to surround the exposed end face of the emissive insert. The annular ring serves to prevent arcing from the copper holder, and maintains the arc on the insert. However, while the silver sleeve of the '425 patent was intended to prolong the life of the copper holder, in practice, this electrode suffers from problems in that the wear does not come from double arcing, but from the hafnium overheating and eroding.

U.S. Pat. No. 3,930,139 (Bykhovsky et al.) which issued on Dec. 30, 1975, and which is incorporated herein by reference, also discloses an electrode for plasma arc working of materials. In the '139 patent, the holder is again formed from copper or copper alloys and an active insert is fastened to the end face of the holder and is in thermal and electrical contact with the holder through a metal distance piece disposed between the active insert and the holder and over the entire contact surface area. The metal distance piece is formed from aluminum or aluminum alloys and the active insert is formed from hafnium or from hafnium with yttrium and neodymium oxides as dopants therein taken separately or in combination. However, while the aluminum sleeve surrounding the active insert in the '139 patent serves to protect the copper holder surrounding the active insert, the aluminum distance piece or sleeve offers no advantages over the silver sleeve of the '425 patent to Severance, Jr.

U.S. Pat. No. 5,676,864 (Walters) which issued on Oct. 14, 1997, discloses an electrode for a plasma arc torch wherein the electrode includes a copper holder having a lower end which mounts an emissive insert that acts as the cathode terminal for the arc during operation. A sleeve of silver is positioned substantially to surround the insert and form an annular ring on the lower end surface of the holder to surround the exposed end face of the emissive insert. The insert assembly further includes an aluminum face plate disposed in the enlarged outer portion of the cavity and which is exposed at the front end of the metallic holder so as to surround a front portion of the sleeve.

U.S. Pat. No. 5,767,478 (Walters) which issued on Jun. 16, 1998, alternatively teaches eliminating the aluminum face plate of U.S. Pat. No. 5,676,864 and instead provides for the front end of the holder to directly contact the emissive insert forming an overlay portion of the holder between the front face thereof and the sleeve, thus protecting the silver sleeve. However, the use of a silver sleeve as described above does not provide for a good mechanical bond with the surrounding copper holder, and could be improved.

SUMMARY OF THE INVENTION

It is an intention of the present invention to provide an electrode adapted for use in a plasma arc torch of the type described, and which is capable of providing significantly improved service life when the torch is used in an oxidizing atmosphere.

In particular, the present invention provides an electrode for supporting an arc in a plasma arc torch. The electrode includes a metallic holder including a front end casting portion having an emissive insert cavity and an outer face; and a rear end portion joined to the front end portion. An emissive insert is mounted in the emissive insert cavity and is a metallic material having a relatively low work function, such as hafnium, zirconium, tungsten, and alloys thereof. The front end casting portion is a metal which is selected from silver, gold, platinum, rhodium, indium, palladium, nickel and alloys thereof. The rear end portion is a metal selected from copper and copper alloys. The emissive insert is a metal selected from hafnium, zirconium, tungsten, and alloys thereof.

It is also contemplated that an embodiment of the present invention includes a cylindrical post which extends inwardly from the outer face of the front end portion. The cylindrical post has an inner-rear tip portion made of a metal selected from copper and copper alloys. It is also further contemplated that the rear end portion may be a casting. It is even further contemplated that an embodiment of the present invention includes casting means for bonding together a front end portion, a rear end portion, and an emissive insert.

The invention also includes a method of fabricating an electrode adapted for supporting an arc in a plasma arc torch. The electrode comprises a holder having a front end portion and a rear end portion. The method includes the machining of a piece of material to form a rear end portion blank and the forming of a notch in one end of the rear end portion blank, so that an end of an emissive insert can be inserted into the notch. A metal selected from silver, gold, platinum, rhodium, indium, palladium, nickel and alloys thereof, is melted and used to form the front end portion of the holder by being cast onto the emissive insert and onto an end of the rear end portion blank, resulting in the formation of a front end portion blank. The front end portion blank and the rear end portion blank constitute a holder blank. The holder blank is then machined to form a finished holder.

The method further contemplates the machining of the holder to form an externally threaded portion and an internal cavity. The internal cavity extends through the rear end portion and into the front end portion of the holder. The material for the rear end portion blank is selected from copper and copper alloys.

The method still further contemplates that the forming of the internal cavity results in the formation of a cylindrical post which extends inwardly from the front end portion of the holder. The cylindrical post has an inner-rear tip portion, which includes a part of the rear end portion, which remained after the cavity was formed.

Features of the electrode of the present invention include adaptability for use in a plasma arc torch of the type described. The invention also provides a significant advantage from the perspective of improved service life when the torch is used in an oxidizing atmosphere. More specifically, the silver (and other suitable metals as described above) gives good conductivity and provides a cooler flow of electricity to the emissive insert and better heat flow out of the emissive insert and through the silver. The joining of the three materials by casting creates a bond that allows a less resistant flow of electrons through each material. The lack of resistance allows the emissive insert to maintain a cooler temperature, and last much longer.

BRIEF DESCRIPTION OF THE DRAWINGS

Some of the advantages of this invention have already been listed above, others will be discussed as this description proceeds, when considered together with the accompanying drawings, in which.

DETAILED DESCRIPTION OF ILLUSTRATIVE, NON-LIMITING EMBODIMENTS

Figure 1:
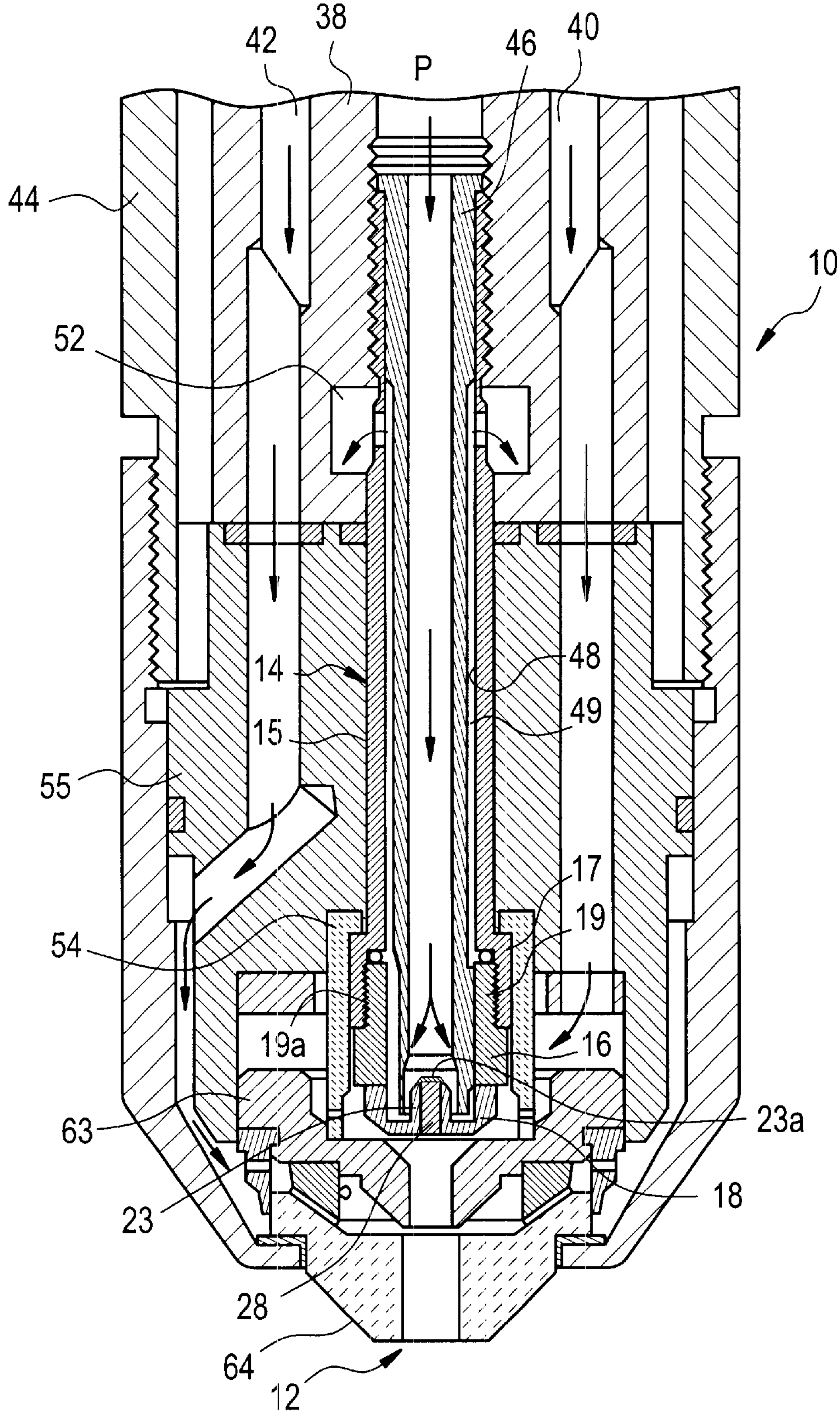
FIG. 1 is a sectional side elevation view of a plasma arc torch which embodies the features of the present invention.
Figure 2:
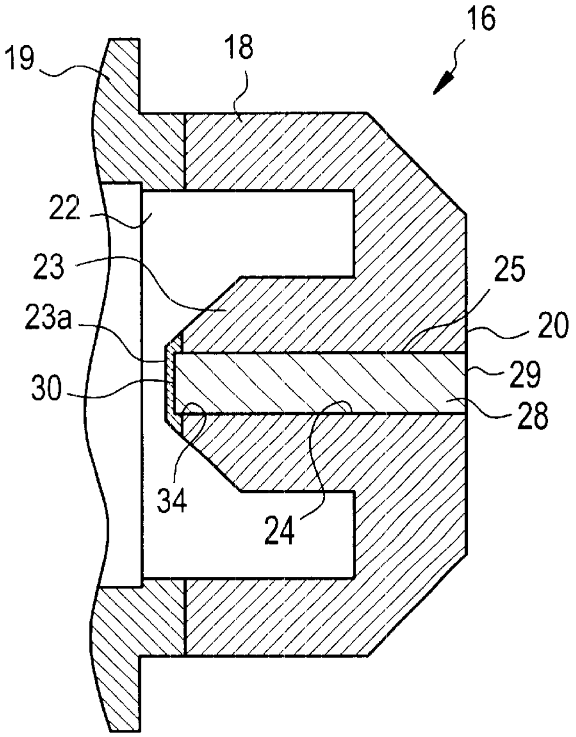
FIG. 2 is a fragmentary, sectional view of the electrode of the present invention and which is used in the plasma arc torch shown in FIG. 1.

In FIG. 1, a plasma arc torch 10 is shown which includes a nozzle assembly 12 and a tubular electrode 14. The electrode 14 is made preferably, but not necessarily, of copper or a copper alloy, and includes an upper tubular member 15 and a lower, cup-shaped member or holder 16. More specifically, the upper tubular member 15 is of elongate open tubular construction and it defines the longitudinal axis of the torch. The upper tubular member 15 also includes an internally threaded lower end portion 17. The holder 16 is also of tubular construction, and it includes a front end portion or front end casting portion 18 and a rear end portion 19, as seen in FIGS. 1 and 2. The front end portion 18 is completely made of a metal, such as, silver, gold, platinum, rhodium, indium, palladium, nickel and alloys thereof. The rear end portion 19 is made of a metallic material, such as, copper and copper alloys.

An end wall (see FIG. 2) closes the front end of the holder 16, and defines a front face 20. The front end portion 18 of the holder 16 extends from the front face 20 and is integrally formed with the rear end portion 19. The rear end portion 19 has an externally threaded section **19*a*, which is threadedly joined to the lower end portion 17 of the upper tubular member 15 (see FIG. 1). The rear end portion 19 also has a notch 34 formed therein (see FIG. 2 and FIG. 4*a***).

The holder 16 is open at the rear end thereof so as to form a cup-shaped configuration and define an internal cavity 22 (FIG. 2). A cylindrical post 23 extends rearwardly from the front face 20 of the holder 16 towards the internal cavity 22 and along the longitudinal axis. The cylindrical post 23 is made from the same material as the front end portion 18, as described above. In addition, a generally cylindrical emissive insert cavity 24 is formed in the holder 16 and extends rearwardly along the longitudinal axis and into a portion of the length of the post 23.

Figure 3:
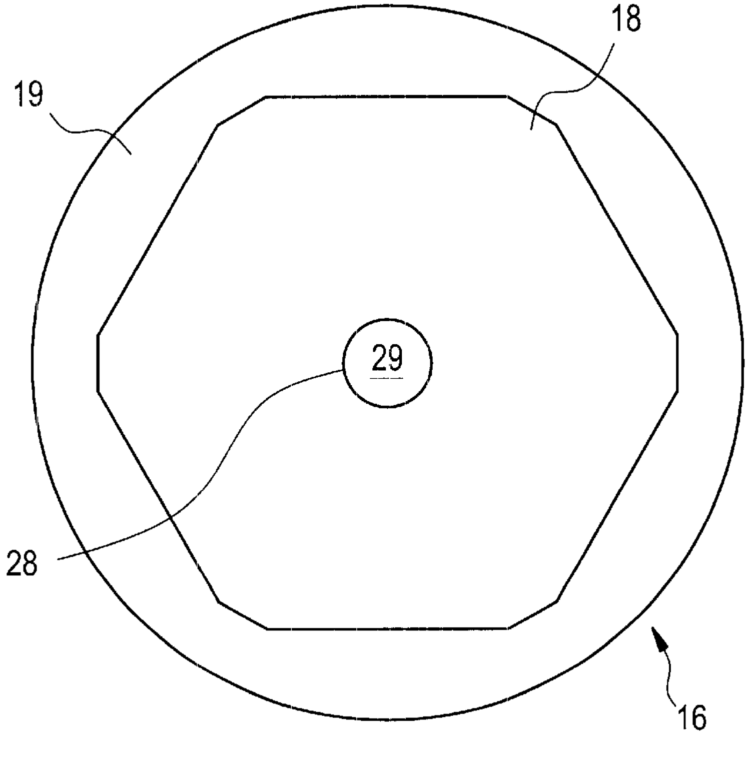
FIG. 3 is an end view of the electrode shown in FIG. 2.

A cylindrical emissive insert 28 is deposited coaxially along the longitudinal axis and has a circular outer end face 29 lying in the plane of the front face 20 of the holder 16, as can be see in FIG. 3. The emissive insert 28 also includes a circular inner end face 30 which is disposed in the emissive insert cavity 24 and which is opposite the outer end face 29. The emissive insert 28 may be slightly tapered toward the inner end face 30. Further, the emissive insert 28 is a metallic material which has a relatively low work function, in a range between about 2.7 to 4.2 ev, so that it is adapted to readily emit electrons upon an electrical potential being applied thereto. Suitable examples of such materials are hafnium, zirconium, tungsten and alloys thereof.

In one embodiment, the cylindrical post 23 has an inner-rear tip portion **23*a*. The inner-rear tip portion 23*a* is made of a copper or copper alloy. As described above, the cylindrical post 23 is made of the same material as the front end portion 18. Thus, the inner-rear tip portion 23*a* is a different material than other portions of the cylindrical post 23. The inner-rear tip portion 23*a* is partially defined by the notch 34 and holds the emissive insert 28 in place during the forming of the front end portion 18, as described further below with reference to the method of fabricating the electrode holder. Thus, one end of the emissive insert 28** extends into and is surrounded by copper or copper alloy.

The electrode according to the above described embodiment of the present invention provides a significantly improved service life. The silver (and other suitable metals as described above, which are used for the front end portion 18) gives good conductivity and provides a cooler flow of electricity to the emissive insert and better heat flow out of the emissive insert and through the silver.

The following table demonstrates the criticality of the present invention by comparing a number of different electrode configurations. All of the electrodes tested included an emissive insert formed of hafnium. The very first test, for example, is described as utilizing "copper only" and refers to a holder made entirely of copper. Whereas "copper with a silver sleeve" refers to the use of only a silver sleeve surrounding a hafnium emissive insert, while the portions surrounding the sleeve are made of copper. Test described as "cast materials" refers to a configuration according to the present invention, where the front end portion 18 is completely made from the disclosed materials.

The tests were conducted by making piercings of flagpoles having lengths of 45 feet. The thickness of the material used for the tests varied from ⅜" to 1". Piercings of the metal were conducted until the electrode failed or was considered worn out by the operator.

TABLE

| Description of Electrode | Pierces |
|---|---|
| Copper Only | 139 |
| Copper Only | 70 |
| Copper holder with silver sleeve | 180 |
| Copper holder with silver sleeve | 240 |
| Cast materials | 511 |
| Cast materials | 447 |

Based on the above results of the piercing tests, it is apparent that the "cast" electrode configuration, according to the present invention, has a substantially longer operating life than prior electrode assemblies.

Figure 4A:
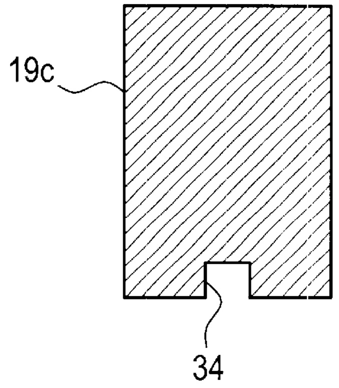
FIGS. 4A–4B illustrate the steps of a method of fabricating the electrode holder of the present invention.
Figure 4B:
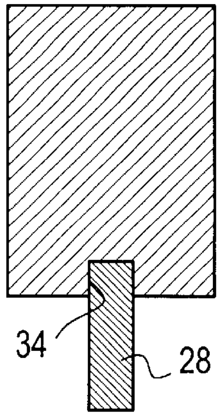
Figure 4C:
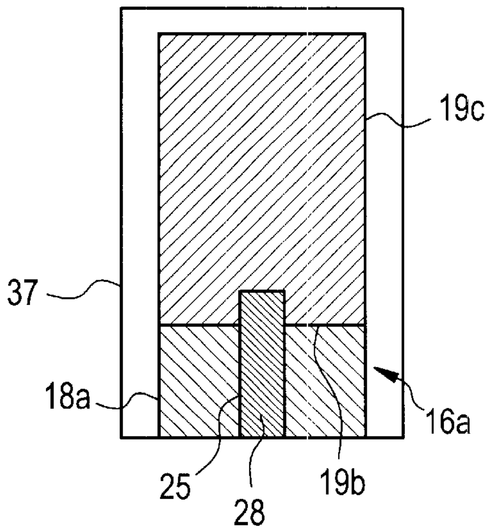
Figure 4D:
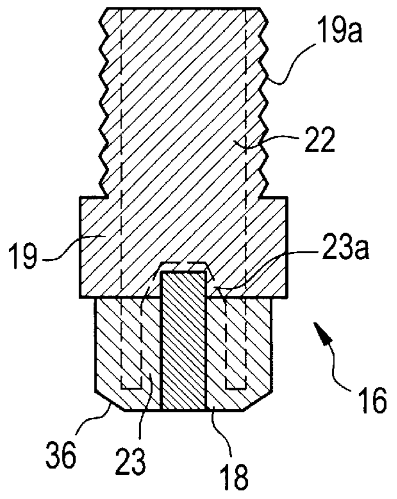

FIGS. 4A–4B illustrate the steps of a method of fabricating the electrode holder of the present invention. The method includes the machining of a piece of copper or a copper alloy (step S1), which is to form a rear end portion blank 19*c*. Also included in step S1 is the forming of the notch 34 at a centralized portion of the copper piece. An end of the emissive insert 28 is then disposed in the notch 34 (step S2). The material used for the emissive insert may be, for example, hafnium, zirconium, tungsten, and alloys thereof. The notch 34 serves to support the emissive holder 28 during the following steps.

A material 18*a* is cast onto the emissive insert (step S3), using a casting mold or casting means 37. As one skilled in the art will appreciate, casting is a manufacturing process for producing accurately dimensioned, sharply defined, smooth or textured-surface metal parts. It is accomplished by forcing molten metal under high pressure into reusable metal dies. The molten metal is injected into a die cavity where it solidifies.

In the present invention, the injected material 18*a* forms a front end portion blank 18*a*, and is disposed in the casting mold 37 by methods know in the art. The material 18*a*, upon solidification, contacts, and is secured to, a front face 19*b* of the rear end portion blank 19*c*, so as to cover the side 25 of the emissive insert. The metal used to form the front end portion blank 18*a* may be, for example, silver, gold, platinum, rhodium, indium, palladium, nickel and alloys thereof. The rear end portion blank 19*c*, the emissive insert 28, and the front end portion blank 18*a*, constitute an electrode holder blank 16*a*.

The electrode holder blank 16*a* is then removed from the casting and is machined into the finished electrode holder 16 (step S4), using methods known in the art. The machining in step S4, includes, but is not limited to, the shaping of the front end casting portion 18, and the rear end portion 19. Also included is the forming of the externally threaded section 19*a*, the internal cavity 22, and the providing of chamfered surfaces 36 on the front end portion 18. As will be appreciated by one skilled in the art, various machining steps may be preformed on the rear end portion 19 before it is bonded to the front end portion blank 18.

The forming of the internal cavity 22 in step S4 also defines the cylindrical post 23, which extends inwardly from the front end portion 18 of the holder 16. The cylindrical post 23 may be formed to have an inner-rear tip portion 23*a* made of, for example, copper and copper alloys. The inner rear tip portion 23*a* is a part of the rear end portion 19 that is left intact during the formation of the internal cavity 22. Specifically, during the step S4, the internal cavity 22 is bored so that it extends into the front end portion 18 and straddles a center part of the rear end portion 19. This preservers a center copper section of the rear end portion 19 to form the inner rear tip portion 23*a* of the cylindrical post 23.

Although the above method discloses the rear end portion blank 19*c* as being machined, and the material for the front end portion blank 18*a* as being cast onto the rear end portion blank 19*c*, it will be appreciated that this process made be reversed. That is, the front end portion blank 18*a* may be cast or machined, followed by the insertion of the emissive insert 28 and the rear end portion blank 19*c* being cast onto the front end portion blank 18*a*.

The joining of the three materials by casting creates a bond that allows a less resistant flow of electrons through each material. The lack of resistance allows the emissive insert to maintain a cooler temperature, and last much longer.

The remaining plasma arc torch structure is conventional and is disclosed in the '425 patent mentioned above. More specifically, as shown in FIG. 1, the electrode 14 is mounted in a plasma arc torch body 38, which has gas and liquid passageways 40 and 42, respectively. The torch body 38 is surrounded by an outer insulated housing member 44.

A tube 46 is suspended in a central bore 48 of the electrode 14 for circulating a liquid medium such as water through the electrode structure 14. The tube 46 is of a diameter smaller than the diameter of the central bore 48 so as to provide a space 49 for the water to flow upon discharge from the tube 46. The water flows from a source (not shown) through the tube 46 and back through the space 49 to an opening 52 in the torch body 38 and to a drain hose (not shown). The passageway 42 directs the injection water into the nozzle assembly 12 where it is converted into a swirling vortex for surrounding the plasma arc. The electrode 14, upon being connected to the torch body 38, holds in place a ceramic gas baffle 54 and a high temperature plastic-insulating member 55. The member 55 electrically insulates a nozzle assembly 12 from the electrode 14.

The nozzle assembly 12 comprises an upper nozzle member 63 and a lower nozzle member 64. The upper nozzle member 63 is preferably, but not necessarily, metal. A ceramic material, such as alumina or lava, is preferably, but not necessarily, used for the lower nozzle member 64.

It is contemplated that numerous modifications may be made to the electrode for plasma arc torch and method of making the same of the present invention without departing from the spirit and scope of the invention as defined in the following claims.

What is claimed is:

1. An electrode for supporting an arc in a plasma arc torch, the electrode comprising:

a metallic holder including, a front end casting portion having an emissive insert cavity and an outer face, and a rear end portion joined to said front end casting portion; and an emissive insert mounted in said emissive insert cavity, said emissive insert being a metallic material having a relatively low work function, wherein said front end casting portion is a metal selected from silver, gold, platinum, rhodium, indium, palladium, nickel and alloys thereof, and wherein said rear end portion is a metal selected from copper and copper alloys.

2. The electrode as claimed in claim 1, wherein said emissive insert is a metal selected from hafnium, zirconium, tungsten, and alloys thereof.

3. The electrode as claimed in claim 1, further including a cylindrical post which extends inwardly from said outer face of said front end casting portion, said cylindrical post having an inner-rear tip portion which is a metal selected from copper and copper alloys.

4. The electrode as claimed in claim 1, wherein said rear end portion is machined.

5. The electrode as claimed in claim 1, wherein said rear end portion is a casting.

6. A method of fabricating an electrode adapted for supporting an arc in a plasma arc torch, the electrode includes a holder having a front end portion and a rear end portion, the method comprising:

machining a piece of material to form a rear end portion blank;

forming a notch in one end of the rear end portion blank;

disposing an end of an emissive insert into the notch;

melting a metal selected from silver, gold, platinum, rhodium, indium, palladium, nickel and alloys thereof, and which is to be used to form the front end portion of the holder;

casting the molten metal onto the emissive insert and onto an end of the rear end portion blank so as to form a front end portion blank, such that the front end portion blank and the rear end portion blank constitute a holder blank; and machining the holder blank to form a finished holder.

7. The method of claim 6, further comprising machining the holder to form an externally threaded portion and an internal cavity, the internal cavity extending through the rear end portion and into the front end portion of the holder.

8. The method of claim 6, further comprising selecting the material for the rear end portion blank from copper and copper alloys.

9. The method of claim 7, wherein said machining the holder to form the internal cavity results in the formation of a cylindrical post which extends inwardly from the front end portion of the holder such that the cylindrical post has an inner-rear tip portion, the inner rear tip portion being formed from a part of the rear end portion, which remained after the internal cavity was formed.

10. An electrode for supporting an arc in a plasma arc torch, the electrode comprising:

a metallic holder including, a front end portion having an emissive insert cavity and an outer face, and a rear end portion joined to said front end portion;

an emissive insert mounted in said emissive insert cavity, said emissive insert being a metallic material having a relatively low work function; and casting means for bonding together said front end portion, said rear end portion, and said emissive insert, wherein said front end portion is a metal selected from silver, gold, platinum, rhodium, indium, palladium, nickel and alloys thereof, and wherein said rear end portion is a metal selected from copper and copper alloys.

* * * * *